(12) United States Patent
Dwinell et al.

(10) Patent No.: US 6,267,293 B1
(45) Date of Patent: Jul. 31, 2001

(54) BAR CODE SCANNING SYSTEM AND METHOD

(75) Inventors: John F. Dwinell, Wrentham; Richard Lydon, Hanover, both of MA (US)

(73) Assignee: CiMatrix, Canton, MA (US)

( * ) Notice: Subject to any disclaimer, the term of this patent is extended or adjusted under 35 U.S.C. 154(b) by 0 days.

(21) Appl. No.: 09/255,167

(22) Filed: Feb. 22, 1999

(51) Int. Cl.[7] ........................................ G06K 7/10
(52) U.S. Cl. ........................ 235/462.12; 235/462.25; 235/462.32; 235/462.01; 235/454; 235/485
(58) Field of Search ................ 235/462.01, 462.02, 235/462.15, 462.18, 462.3, 462.32, 462.36, 462.37, 470, 485, 462.12, 462.25, 462.07, 454

(56) References Cited

U.S. PATENT DOCUMENTS

| | | | |
|---|---|---|---|
| 3,995,166 | * 11/1976 | Hobart et al. | 235/61.11 E |
| 4,409,469 | * 10/1983 | Yasuda et al. | 235/454 |
| 4,973,829 | * 11/1990 | Ishida et al. | 235/462 |
| 5,028,772 | * 7/1991 | Lapinski et al. | 235/467 |
| 5,045,677 | * 9/1991 | Okamura | 235/462 |
| 5,241,164 | * 8/1993 | Pavlidis et al. | 235/462 |
| 5,262,626 | * 11/1993 | Goren et al. | 235/462 |
| 5,296,691 | * 3/1994 | Waldron et al. | 235/462 |
| 5,438,188 | * 8/1995 | Surka | 235/462 |
| 5,444,231 | * 8/1995 | Shellhammer et al. | 235/462 |
| 5,457,308 | * 10/1995 | Spitz et al. | 235/462 |
| 5,481,097 | * 1/1996 | Tafoya | 235/462 |
| 5,493,108 | * 2/1996 | Cherry et al. | 235/454 |
| 5,545,887 | * 8/1996 | Smith et al. | 235/462 |
| 5,777,310 | * 7/1998 | Liu et al. | 235/462 |
| 5,821,519 | * 10/1998 | Lee et al. | 235/462 |
| 6,000,618 | * 12/1999 | Saporetti | 235/462.24 |
| 6,006,992 | * 12/1999 | Watanabe et al. | 235/462.12 |
| 6,073,847 | * 6/2000 | Reichenbach et al. | 235/462.12 |
| 6,145,745 | * 11/2000 | Hauser et al. | 235/462.07 |

\* cited by examiner

*Primary Examiner*—Karl D. Frech
*Assistant Examiner*—Uyen-Chau N. Le
(74) *Attorney, Agent, or Firm*—Iandiorio & Teska

(57) ABSTRACT

A bar code scanning system and method for scanning a bar code containing a key including successively scanning the bar code and providing, for each scan, a plurality of data elements forming a scan fragment for at least a portion of the bar code, identifying each fragment containing a portion of a reference key, detecting when there has been a match between a reference key and the identified key fragments, determining if a complete key has been constructed from the key fragments, calculating a displacement between the key fragments which constructed the complete key, and aligning data fragments of the bar code by placing each successive data fragment in alignment with the previous data fragment offset by the amount of the displacement.

39 Claims, 16 Drawing Sheets

|  | TRANSITION POINTS | FRAGMENTS AND DATA ELEMENT WIDTHS |
|---|---|---|
| SCAN $S_1$ | p60 p70 | 10 |
| SCAN $S_2$ | p40 p50 p60 p70 | 10 10 10 |
| SCAN $S_3$ | p20 p30 p40 p60 | 10 10 20 |
| SCAN $S_4$ | p20 p40 p50 p60 | 20 10 10 |
| SCAN $S_5$ | p10 p20 p30 p40 p60 p70 | 10 10 10 20 10 |
| SCAN $S_6$ | p10 p20 p40 p60 | 10 20 20 |
| SCAN $S_7$ | p20 p40 p50 p60 | 20 10 10 |
| SCAN $S_8$ | p10 p20 p30 p40 p50 p70 | 10 10 10 10 20 |
| SCAN $S_9$ | p10 p20 p30 p60 | 10 10 30 |
| SCAN $S_{10}$ | p10 p40 | 30 |
| SCAN $S_{11}$ | p10 p20 | 10 |

BAR CODE SCANNING SYSTEM AND METHOD

FIELD OF INVENTION

This invention relates to a bar code scanning system and method and more particularly to one which repeatedly scans a bar code and compares the data scanned with a predetermined key to establish a displacement which enables accurate reconstruction of the entire bar code from individual scan fragments.

BACKGROUND OF INVENTION

Optical scanning systems are used throughout industry for many applications. One such application is bar code scanning and decoding. Bar code symbols are printed on many products and packages today allowing for high speed, accurate and efficient routing of the parcels throughout packaging, shipping and sorting facilities. These bar codes are either printed on the outside of the package in an easily visible location or printed on a label affixed to the outside of the package so that they can be scanned by bar code readers and scanning devices.

Often, these bar code scanning devices are mounted above a conveyor belt and the packages being scanned are placed on a conveyor belt which moves below the scanning device. As the packages pass beneath the scanning device, the bar code is read and decoded.

The positioning of these bar codes on the package is critical for proper scanning and decoding. If the bar code is positioned at any angle, other than a right angle, to the path of the scanning laser beam, the entire bar code may not be scanned in one sweep, resulting in an incomplete scan and a bar code fragment being retrieved. If this occurs, several of these fragments will then have to be "stitched" together to assemble an entire bar code. There are several methods known in the field of bar code scanning to accomplish this stitching and reconstruction of bar codes.

One method of assembling a complete bar code from incomplete fragments checks the individual fragments to see if they contain a start or stop mark. If the scan contains both, the bar code is deemed complete and processing stops. However, in the event that the scan is incomplete, successive scan fragments are superimposed on top of the previous scan fragment until a complete bar code is assembled. The successive scan fragments are aligned with the previous fragments by repeatedly shifting the individual successive fragments until a match is found between the bars and spaces of the bar code and, at that point, the successive fragments are superimposed on top of each other.

There are several problems associated with this method, all which originate from the fact that successive fragments are repeatedly shifted until they are in alignment with the previous fragment. This approach to aligning fragments requires considerable processor power, resulting in CPU loading and slow performance. This situation is only exacerbated when the scan length, or data string length, is considerably long resulting in a high number of shifts required to align each successive fragment.

An alternate method of "stitching" incomplete bar code fragments into a complete bar code scans individual bar code fragments and repeatedly stores them in data registers. Several comparisons are made to determine whether the fragments scanned are within acceptable tolerances and to determine the symbology ratio of the bar code scanned. In the event that the data scanned is valid, it is transferred to a state machine which assembles the individual data elements (e.g. the bars and spaces) into data strings. The processor in this system monitors several variables from successive fragments, such as label position value and narrow width value. In the event that these variables indicate that a match is probable, the current scan fragment is repeatedly shifted until it is aligned with the previous fragment. Since this method utilizes the same repeated shifting alignment method, it suffers from the same shortcomings as the previous method (high CPU utilization and low performance).

A slightly modified method of assembling bar code fragments utilizes a position counter to specify a middle portion of each scan fragment to be examined for alignment purposes. This method looks for matching data strings within this valid middle portion to determine when there is a match between a current scan fragment and its previous scan fragment. In the event that a match is found, the scanned fragment is repeatedly shifted until alignment occurs with that of the previous scan fragment. Again, this system suffers from the same problems (high CPU utilization and low performance) that afflict the previously-described methods.

Another method of reconstructing a bar code from incomplete bar code fragments utilizes several timing measurements concerning: the time the scan sweep starts; the time the first data element is scanned; and the time the scan sweep stops, to reconstruct a complete bar code. These three timing measurements are used to calculate parcel velocity and to predict the location of matching portions, or data elements, within each scan fragment. These measurements enable this method to calculate an offset which is used to shift subsequent fragments, relative to the previous fragment, so that the bar code fragments can be aligned.

Since this method relies on and requires highly accurate time measurements to predict the location of matching data portions within each fragment, precision tolerances are required concerning the optics, opto-mechanics, and electronics utilized by a system employing this method. This results in the system being prohibitively expensive and requiring a high level of maintenance to ensure that such precise tolerances are maintained. Additionally, since the valid middle portion of each scan fragment is scrutinized to determine when a match occurs, this scanning method relies on the content of the data scanned to accurately align the numerous scan fragments. Therefore, any inaccuracy in the data retrieved from the individual data elements within each fragment Will result in a misalignment of the scan fragments.

Yet another method of assembling a complete bar code from individual bar code fragments repeatedly scans the bar code to generate bar code fragments. During use, once a bar code is found, the first bar code fragment is aligned with the second bar code fragment by aligning the leading edge of the first data element in each fragment. Once these two elements are aligned, a measurement is taken to determine the offset between these two fragments. This offset measurement is then used to align and assemble all subsequent fragments until a complete bar code is constructed. To align subsequent fragments, each fragment is analyzed to determine an alignment bar, or data element, within each fragment. This particular salient data element is selected as an alignment indicia, which is essentially a data element present in both fragments. The salient indicia are aligned to shift one of the fragments so that both fragments are aligned.

There are several problems associated with this method, including those of the previous method e.g. requiring extremely precise components, relying on the content of the bar code label to align subsequent scans. Additionally, this method requires that at least two scans pass through the leading edge of the bar code being scanned because the first two scans of the bar code are aligned, based on this leading edge, to determine the value of the offset utilized to shift subsequent scans. If a conveyor belt is utilized in which the packaging on the conveyor belt is moving at a high rate of speed, it is possible that only one scan would pass through the leading edge of the bar code element. In the event of a slowly moving scanning beam, the same result would occur. Additionally, since the scanning beam tends to move at a very high rate of speed, this device is subject to inaccuracies resulting from an increased depth of field. The further away a bar code is from the laser scanning source, the smaller each feature or element of the bar code appears. Therefore, the accuracy of the offset determined by shifting the first two scan fragments into alignment is further diminished. Specifically, as the depth of field increases, the accuracy of the optics and electrical components utilized in a system employing this method must increase accordingly, a difficult task when considering the precise level of the components required for a normal depth of field.

SUMMARY OF INVENTION

It is therefore an object of this invention to provide a scanning system and method which improves accuracy while reducing cost and maintenance requirements.

It is a further object of this invention to provide such a system and method which reduces processor loading while improving performance.

It is a further object of this invention to provide such a system and method which aligns consecutive bar code fragments independent of the data encoded within the bar code.

It is a further object of this invention to provide such a system and method which enables high-precision bar code reconstruction through the use of standard-precision optical components.

It is a further object of this invention to provide such a system and method which enables accurate bar code reconstruction without requiring multiple passes through the leading edge of the bar code.

It is a further object of this invention to provide such a system and method in which bar code scan alignment is achieved without repeatedly shifting one scan fragment in relation to the other.

It is a further object of this invention to provide such a system and method which calculates the offset required to align consecutive bar code scan fragments without relying on high-precision time measurements.

This invention results from the realization that a truly effective bar code scanning system and method for scanning a bar code containing a reference key can be achieved by repeatedly scanning a bar code to generate bar code fragments, analyzing each fragment to determine if it contains a portion of the reference key and to determine which data elements within the fragment duplicate data elements in the reference key, aligning fragments containing a portion of the reference key, and calculating a displacement offset from the alignment of the key fragments which is used to align the remaining data fragments in the bar code.

This invention features a bar code scanning system for scanning a bar code containing a key including: a scanning device for successively scanning the bar code and providing, for each scan, a plurality of data elements forming a scan fragment for at least a portion of the bar code; a key detector, including a reference key, responsive to said scanning device, for identifying a fragment containing at least a portion of a key; a fragment matching device, responsive to the key detector, for aligning an identified key fragment with the reference key; a key comparator, responsive to the fragment matching device, for determining when a complete key has been constructed from the key fragments; a displacement calculator, responsive to the construction of the complete key, for calculating a displacement between the key fragments which constructed the complete key; and a data fragment aligner for aligning data fragments of the bar code by placing each successive data fragment in alignment with the previous data fragment offset by the amount of the displacement.

In a preferred embodiment, the bar code may include a plurality of bars and spaces and each data element in the fragment is representative of one of the bars or spaces. The scanning device may include a laser scanner. The laser scanner may include a laser source for generating a scanning beam, a multi-faceted mirror wheel for sweeping the scanning beam in a predetermined pattern across the object being scanned, and a radiation detector, responsive to the scanning beam reflected from the object being scanned, for generating the plurality of data elements. The predetermined pattern of the scanning beam may be an "X".

The key detector may include a means for storing the reference key where the reference key includes a plurality of data elements. The key detector may include a means for comparing a portion of the data elements of a key fragment to the reference key to determine if corresponding data elements in the key fragment and the reference key are compatible. The means for comparing may include a means for defining compatible data elements to be data elements equivalent to within a specified tolerance.

The specified tolerance may be ±15%. The means for comparing may include a means for discarding the key fragments when the portion of the data elements of the key fragments are not compatible with the data elements of the reference key. The means for comparing may be a software routine.

The fragment matching device may include a means for aligning the data elements of a first key fragment with the data elements of the reference key and determining which data elements are compatible. The data elements of each subsequent key fragment after the first key fragment may be aligned with the data elements of the reference key and may be aligned and combined with each previous key fragment to form a complete key, as determined by the key comparator. The means for aligning may include a means for defining compatible data elements to be data elements equivalent to within a specified tolerance. The specified tolerance may be ±15%. The means for aligning may be a software routine.

The displacement calculator may include an offset means for determining the sum value of non-aligned data elements in the constructed key. The offset means may be a software routine.

The bar code scanning system may include a counter for determining the width of each data element in each fragment. The counter may include a means for resetting the counter periodically during each scanning beam sweep. The means for resetting may reset the counter at the beginning of each scanning beam sweep. The counter may include a means for incrementing the counter as the scanning beam sweeps across the object being scanned. The counter may include a means for storing the value of the counter at each transition between data elements. The counter means may include a means for subtracting the stored counter value of the previous transition from the stored counter value of the current transition to generate a data element width for each data element. The counter may be a software routine.

The data fragment aligner may include a means for offsetting each data fragment a value equal to the displacement, relative to each previous data fragment, to create a stitched bar code, where the means for offsetting continues offsetting subsequent data fragments a value equal to the displacement until all subsequent data fragments are offset relative to the corresponding previously-scanned data fragment and superimposed upon the corresponding previously-scanned data fragment. The means for offsetting may be a software routine.

The reference key may include a start indicator, a stop indicator, or both a start and a stop indicator.

This invention also features a computer readable medium having a plurality of instructions stored thereon which, when executed by the processor, cause the processor to perform the steps of: scanning a bar code successively; providing, for each scan, a plurality of data elements forming a scan fragment for at least a portion of the bar code; identifying each fragment containing a portion of a key; detecting when there has been a match between a reference key and identified key fragments; determining if a complete key has been constructed from the key fragments; calculating a displacement between the key fragments which constructed the complete key; and aligning data fragments of the bar code by placing each successive data fragment in alignment with the previous data fragment offset by the amount of the displacement.

In a preferred embodiment, the computer readable medium may be a hard disk drive, a read-only memory, and a random-access memory.

This invention also features a processor and memory configured to perform the steps of: scanning a bar code successively; providing, for each scan, a plurality of data elements forming a scan fragment for at least a portion of the bar code; identifying each fragment containing a portion of a key; detecting when there has been a match between a reference key and identified key fragments; determining if a complete key has been constructed from the key fragments; calculating a displacement between the key fragments which constructed the complete key; and aligning data fragments of the bar code by placing each successive data fragment in alignment with the previous data fragment offset by the amount of the displacement.

In a preferred embodiment, the processor and memory may be incorporated into a personal computer, a programmable logic controller, and a single-board computer.

This invention also features a method for assembling a bar code containing a reference key from a series of bar code fragments comprising the steps of: scanning a bar code successively; providing, for each scan, a plurality of data elements forming a scan fragment for at least a portion of the bar code; identifying each fragment containing a portion of key; detecting when there has been a match between the reference key and identified key fragments; determining if a complete key has been constructed from the key fragments; calculating a displacement between the key fragments which constructed the complete key; and aligning data fragments of the bar code by placing each successive data fragment in alignment with the previous data fragment offset by the amount of the displacement.

DISCLOSURE OF PREFERRED EMBODIMENT

Other objects, features and advantages will occur to those skilled in the art from the following description of a preferred embodiment and the accompanying drawings, in which.

Figure 1:
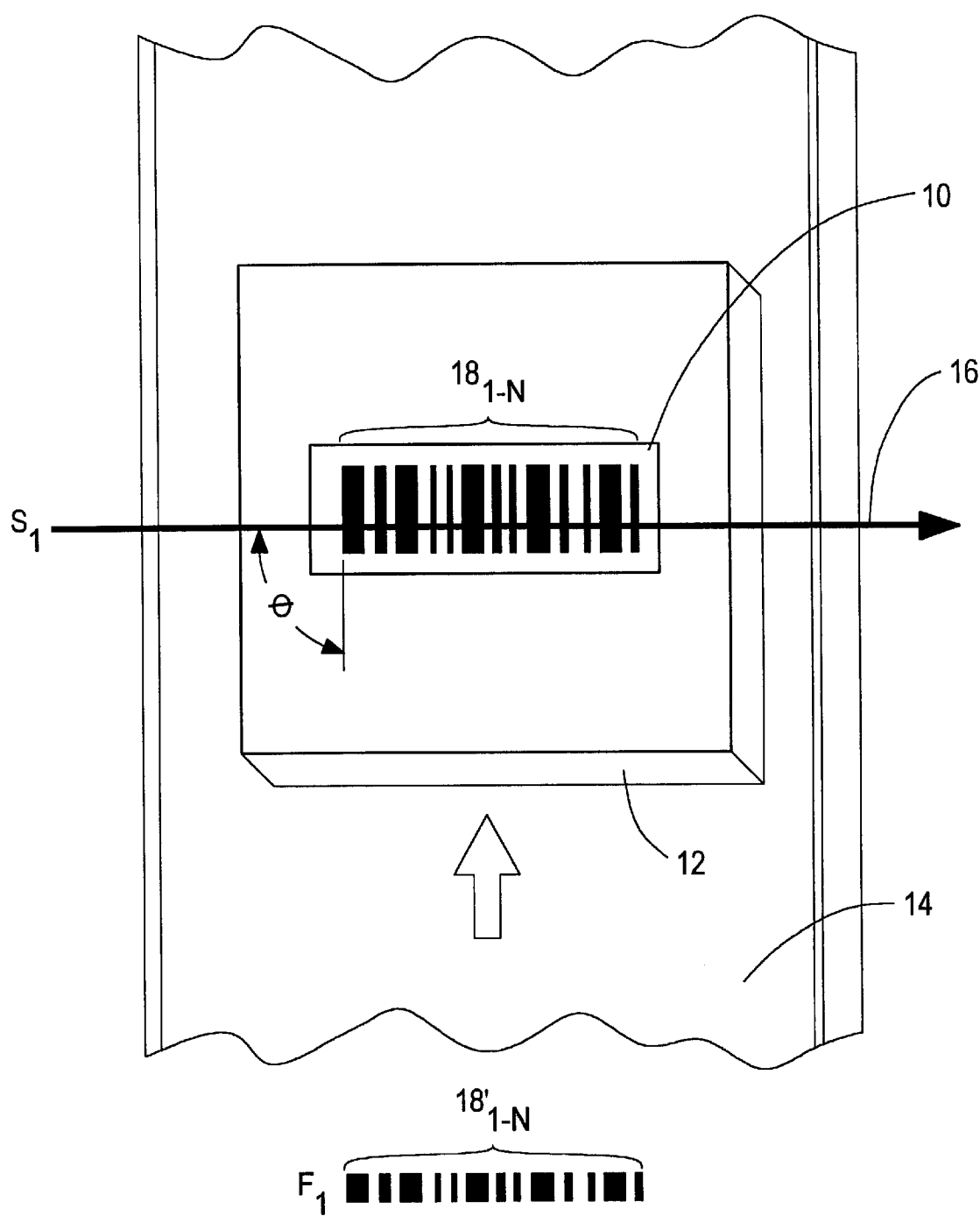
FIG. 1 is a plan view of a bar code being scanned perpendicular to its bars and spaces.

As discussed in the background of the invention above, optical scanning systems are often used in industry to scan a bar code 10, FIG. 1, printed on parcels 12 or packages. These parcels 12 are often placed on a conveyor belt 14 which moves the parcel beneath the scanning device which sweeps a scanning beam 16 across bar code 10. When the angle θ between scanning beam 16 and the individual bars and spaces $18_{1-n}$ of bar code 10 is 90°, scanning beam sweep $S_1$ passes through every bar and space $18_{1-n}$ of bar code 10. This results in scanning beam sweep $S_1$ providing a single fragment $F_1$ which contains data $18'_{1-n}$ indicative of every bar and space $18_{1-n}$ of bar code 10. Therefore, one pass of scanning beam 16 through bar code 10 produces a fragment $F_1$ indicative of the entire bar code 10 and scanning is complete.

Figure 2:
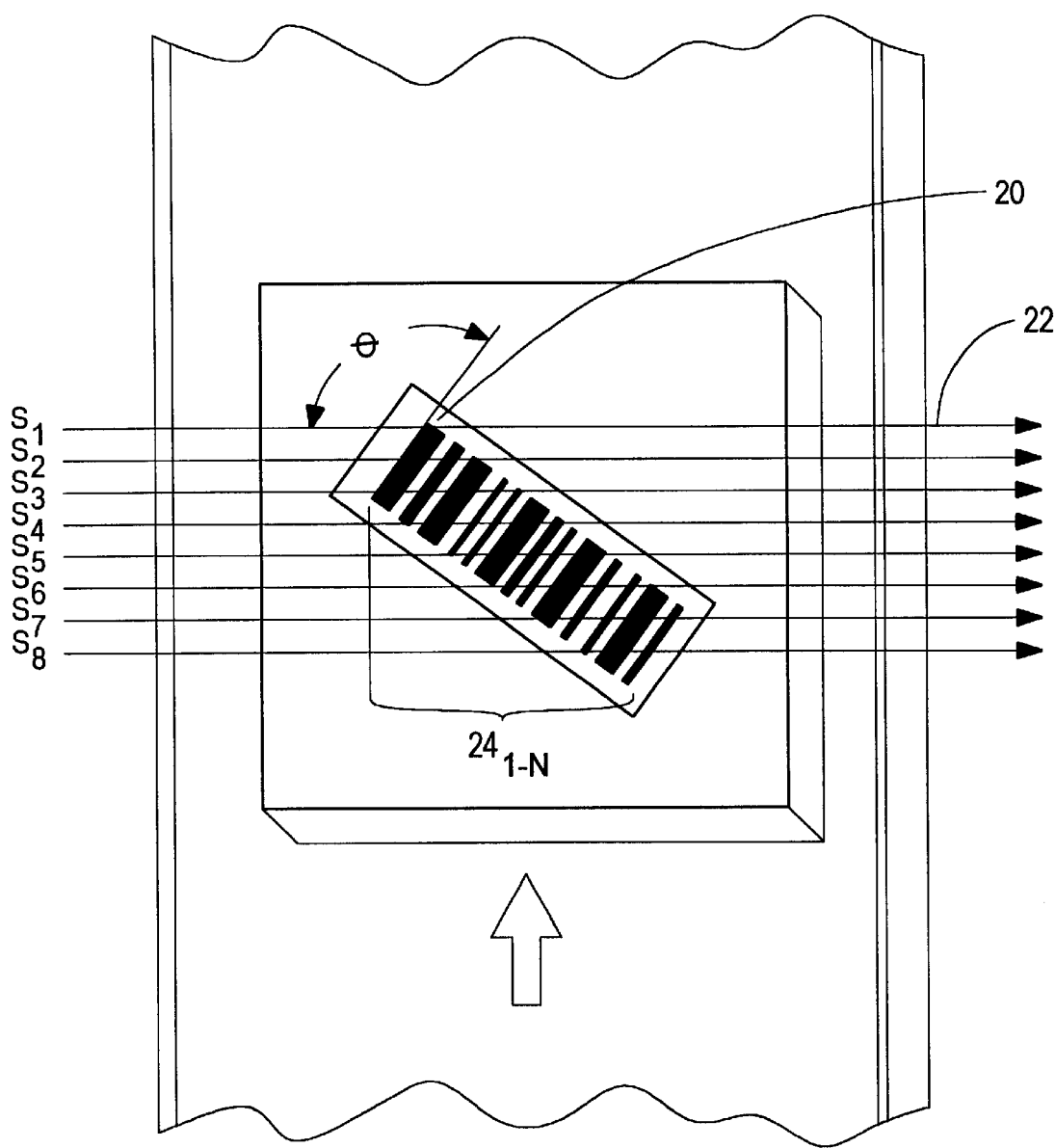
FIG. 2 is a plan view of a bar code being scanned at an angle not perpendicular to its bars and spaces.
Figure 2:
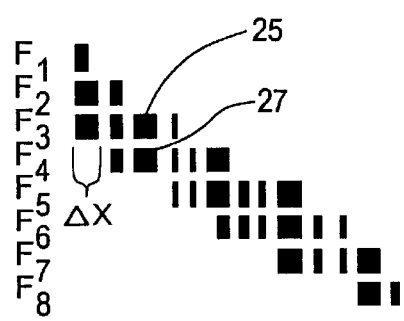

However, the scanning bean is not always perpendicular to the individual bars and spaces of the bar code. In the event that the bar code 20, FIG. 2, is not perpendicular (θ does not equal 90°) to the scanning beam 22 at the time the bar code 20 is scanned, no single scanning beam will pass through every bar and space $24_{1-n}$ of bar code 20. This results in a plurality of scan beam sweeps $S_{1-8}$ being required to scan every bar and space $24_{1-n}$ of bar code 20. While in this particular example, eight scan beam sweeps $S_{1-8}$ are required to scan bar code 20, this is for illustrative purposes only, as the length of the bar code and the angle of the scan, θ, will vary the number of scans required. Each scan sweep $S_{1-8}$ produces a corresponding scan fragment $F_{1-8}$, where no individual scan fragment $F_{1-8}$ contains every bar and space $24_{1-n}$ of bar code 20. This mandates that these individual scan fragments $F_{1-8}$ be "stitched" together to reconstruct bar code 20 from the individual scan fragments $F_{1-8}$. In order to reconstruct bar code 20 from fragments $F_{1-8}$, the individual fragments must be offset, relative to each other, by a displacement, $\Delta x$, so that any common elements, for example elements 25 and 27, of the individual fragments $F_{1-8}$ can be aligned.

Figure 3:
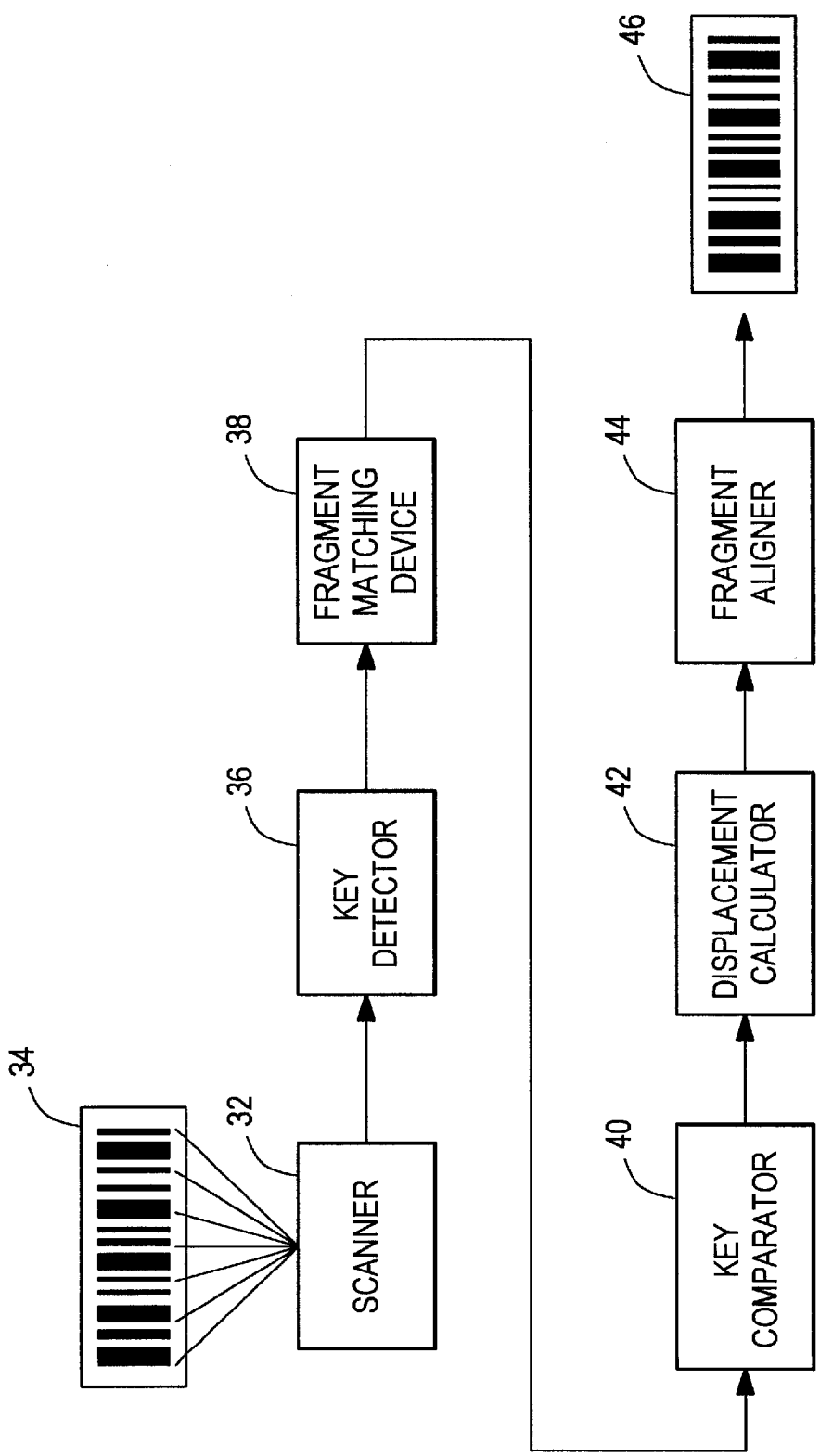
FIG. 3 is a diagrammatic view of a bar code scanning system according to this invention.

In accordance with this invention, the bar code scanning system 30, FIG. 3, includes a scanning device 32 for successively scanning a bar code 34. Since, as stated above, there is a high probability that multiple scan beam sweeps will be required to scan the entire bar code, a plurality of fragments will be generated and provided to key detector 36. A key is a series of data elements typically at the beginning and/or end of a bar code which allows a bar code scanner to discern a valid bar code from extraneous information. Key detector 36 includes a reference key and examines each fragment produced by scanner 32 to identify fragments containing at least a portion of the desired key. This reference key is a plurality of data elements present at the beginning and/or end of a bar code. In the event that the fragment contains a portion of the key, it is a valid key fragment and is retained for further processing, otherwise it is discarded. Fragment matching device 38 examines these key fragments, which were identified valid by key detector 36, to determine which data elements within the key fragments overlap and are, therefore, compatible with the data element of the reference key. Compatible overlapping data elements are then aligned with the reference key by fragment matching device 38. These aligned key fragments are then analyzed by key comparator 40 to determine if a complete key has been constructed. If the key is incomplete, additional key fragments are analyzed and aligned with the reference key.

Once the desired key has been fully constructed by the aligned key fragments, this complete key is passed to displacement calculator 42, which analyzes the complete key to determine the recurring amount that each subsequently scanned key fragment had to be offset, relative to its previously scanned key fragment, to align compatible data elements. This offset between successively scanned key fragments is essentially constant for all key fragments required to construct the complete key. While data element scan truncation can result in marginal offset variations, these variations are minimized by discounting the data elements appearing at the extremities of each scan, the only areas where data element scan truncation can occur. Once this offset is calculated by displacement calculator 42, data fragment aligner 44 aligns all remaining data fragments of bar code 34 by offsetting subsequently scanned data fragments a value equal to this calculated offset so that all the fragments required to completely scan bar code 34 can be aligned and "stitched" bar code 46 can be produced.

Figure 4A:
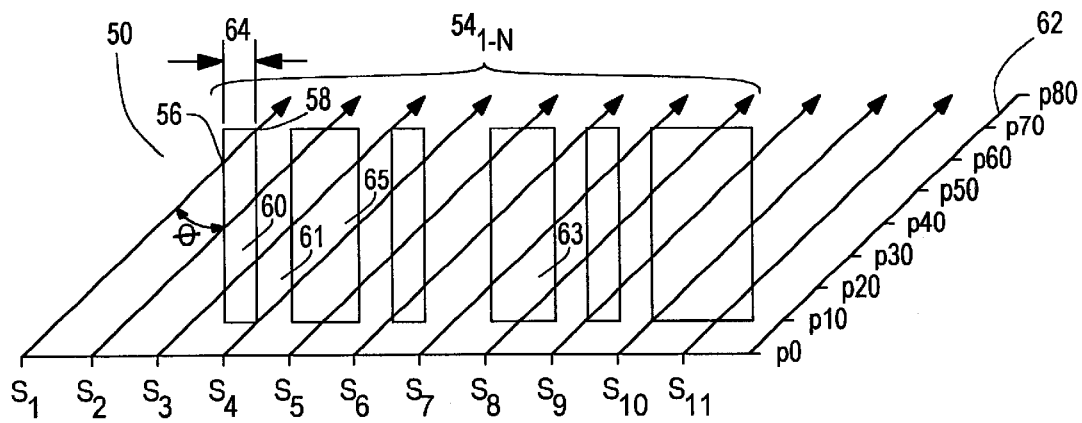
FIG. 4A is a plan view of a bar code reference key being scanned at an angle not perpendicular to its bars and spaces and the scan fragment and plurality of data elements produced by each scan sweep according to this invention.

During operation of the bar code scanner system 30 of this invention, whenever a bar code reference key 50, FIG. 4A, is scanned and the path of scanning beams $S_{1-11}$ are at an angle $\theta$ other than 90° with respect to the bar code elements, there is a high probability that no single scanning beam $S_{1-11}$ will pass through all the bars and spaces $54_{1-n}$ of reference key 50. Therefore, multiple scanning beams $S_{1-11}$ will be required to scan all bars and spaces $54_{1-n}$ of reference key 50. As stated above, while, in this particular example, eleven scan beam sweeps $S_{1-11}$ are required to scan reference key 50, this is for illustrative purposes only, as the length and height of the bar code and the angle of the scan, $\theta$, will vary the number of scans required.

As each individual scanning beam $S_{1-11}$ passes across the object being scanned, the point at which each transition occurs from a space to a bar 56 and from a bar to a space 58 is recorded. For illustrative purposes, the positions along the path of scanning beams $S_{1-11}$ are marked on transition point scale 62 from p0–p80 in 10 unit increments. This transition point scale 62 is for illustrative purposes only and numerous modifications can be made: the position could decrement as the scanning beam moves across the conveyor belt, the position indicator could be reset to zero at some point other than at the beginning of each scan sweep, etc.

During the passing of scan beam sweep $S_1$, FIG. 4A, across reference key 50, a first transition occurs at transition point 56 where the leading edge of bar 60 is encountered. This occurs at position p60 in accordance with transition point scale 62. Additionally, a second transition occurs when scanning beam sweep $S_1$ leaves bar 60 at transition point 58. According to transition point scale 62, this occurs at position p70. The position of each transition along each scanning beam sweep is recorded as shown in the table in FIG. 4A. This transition recording is repeated for all scanning beams $S_{1-11}$ required to completely scan the reference key.

In order to determine a data element width 64 for each bar and space $54_{1-n}$ in reference key 50, the value stored for the previous transition is subtracted from the value stored for the current transition. Specifically, for scan sweep $S_1$ and bar 60, where transitions 56 and 58 occur at positions p60 and p70 respectively, a data element width 64 is determined for bar 60 by subtracting the value of the first or previous transition p60 from the value of the second or current transition p70 to derive a data element 52 having a width of 10. In this particular example, since scan sweep $S_1$ only encounters bar 60, the fragment 53 generated by scan sweep $S_1$ is only one element long. Concerning scan sweep $S_2$, a first transition occurs at position p40 when it encounters bar 60 and a second transition occurs at position p50 when it leaves bar 60 and enters space 61. A third transition occurs at position p60 when scan sweep $S_2$ enters bar 65 and a fourth and final transition occurs at position p70 when scan sweep $S_2$ leaves bar 65. These four transitions generate the three data elements which make up fragment 66. Specifically: the position of the fourth transition p70 less the position of the third transition p60 generates a data element 67 having a width of 10; the position of the third transition p60 less the position of the second transition p50 generates a data element 68 having a width of 10; and the position of the second transition p50 less the position of the first transition p40 generates a data element 69 having a width of 10. This process is repeated, in this example, for the remaining nine scan sweeps $S_{3-11}$ until the point at which each transition occurs along each scanning sweep $S_{1-11}$ is recorded.

This results in a series of unaligned fragments $F_{1-11}$, shown in the right hand column of the table accompanying FIG. 4A, which are derived from the points at which each transition occurs as the scanning beam sweeps across the reference key 50 being scanned.

Figure 4B:
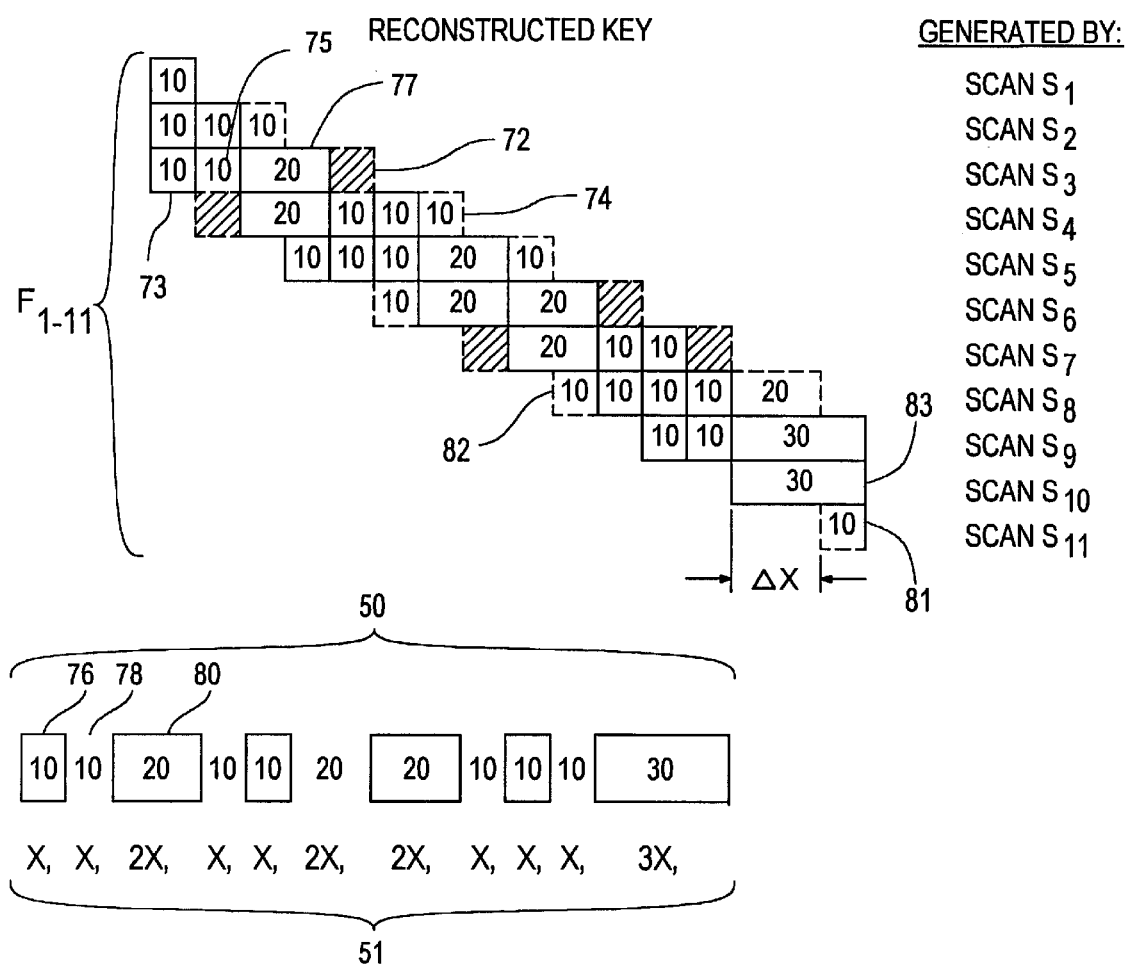
FIG. 4B is a plan view of a reconstructed key produced by the aligning of the scan fragments of FIG. 4A with the reference key.

These individual fragments $F_{1-11}$ must now be aligned with compatible data elements in reference key 50 in order to reconstruct reference key 50, as scanned by scanning beams $S_{1-11}$. The individual scan fragments $F_{1-11}$, FIG. 4B, are aligned by comparing the data elements of scan fragment $F_{1-11}$ to the data elements of reference key 50, to determine which individual data elements, for example elements 77 and 80, present in fragment 72 and reference key 50, are compatible with each other. For example, in this specific situation where eleven scanning beam sweeps $S_{1-11}$ are required to completely scan the reference key, fragment 72 is analyzed to determine which individual data elements are compatible with data elements in reference key 50. Specifically, the first 73, second 75, and third 77 data elements of fragment 72 have values equal to the first 76, second 78, and third 80 data elements of reference key 50. Therefore, these equivalent, or essentially equivalent, data elements are placed into alignment by aligning these compatible data elements. This procedure is repeated for all scan fragments $F_{1-11}$ until the complete reference key scanned is reconstructed. Since the value Δx required to offset each key fragment, for example fragment 74, in relation to its previously-scanned key fragment, for example fragment 72, is constant, once this offset is determined, all remaining data fragments of the bar code can be aligned. Specifically, the value Δx required to offset each fragment is calculated by determining the sum value of non-aligned data elements between consecutively scanned key fragments. For example, fragment $F_{11}$ produced by scan sweep $S_{11}$ has one data element 81 which has a sum value of 10. Fragment $F_{10}$ produced by scan sweep $S_{10}$ has one data element 83 which has a sum value of 30. The difference between these two sums is 20 which is the calculated offset or Δx.

It is important to note that while reference key 50 is shown in this example as a series of numeric values (i.e. 10, 10, 20 . . . ), this is for illustrative purposes only. Typically, a reference key is a series of symbology ratios 51. For example, while reference key 50 is shown as eleven numeric data elements (namely 10, 10, 20, 10, 10, 20, 20, 10, 10, 10 and 30), this reference key would typically comprise a series of ratios 51 (i.e. X, X, 2X, X, X, 2X, 2X, X, X, X, 3X).

Note that FIG. 4A discloses eleven fragments $F_{1-11}$ which are unaligned. This can be seen by the fact that the left-most data element of each fragment is aligned regardless of the value of the data elements themselves. As shown in FIG. 4B, these same fragments $F_{1-11}$ are then aligned by aligning compatible data elements, for example elements 73, 75, 77 and 76, 78, 80, in each individual scan fragment $F_{1-11}$ and reference key 50. When each fragment is aligned in relation to reference key 50, all compatible data elements are aligned, where each fragment is offset by a value equal to the calculated offset, Δx. Note that, for illustrative purposes only, fragments and a reference key are shown which are short in length, resulting in a minimal amount of overlap between consecutive fragments. In actual use, the fragments would be considerably longer and the scan rate would be considerably higher, resulting in a higher incidence of overlap between consecutive scans.

As stated earlier, the first portion of any bar code scanned is a reference key and has a known pattern. The individual data elements of any fragment can first be compared to the desired reference key (or known pattern) to determine if the individual scan fragment is part of that bar code key or pattern. Specifically, bar codes usually employ start, stop, or start and stop indicators at the beginning and end of the bar code. These indicators are often referred to as reference keys and have known patterns. These start and/or stop indicators usually consist of several bars and/or spaces. Since the start and/or stop indicators are a known pattern, the individual fragments scanned can first be compared to the reference key to determine if the individual scan fragments are the result of the bar code scanning system having scanned such a reference key. Once it is determined that the specific scan fragment was generated by scanning a reference key, this scan fragment is then stored for subsequent alignment using the method described above. Additionally, this scanning and alignment procedure is repeated until the entire reference key is completely reconstructed from the individual scan fragments. Once this reference key is completely reconstructed, the offset, Δx, calculated for aligning and reconstructing the reference key is used to align the subsequent data fragments which make up the remainder of the bar code.

Note that at the beginning or end of each scan sweep, a partial data element may be generated. This can occur when the scanning beam sweep enters the bar code in the middle of a bar. For example, the first element 82, FIG. 4B, of scan sweep S8 is shown having a value of 10 with a perimeter marked by a broken line. This is indicative of an incomplete bar element scan. In scan beam sweep S8, FIG. 4A, a first transition was encountered at position p10 and a second transition, from a bar to a space, was encountered at position p20, which would normally indicate a data element having a width of 10. However, the actual element being scanned, namely the fourth bar 63 of bar code 50, has an actual width of 20. Therefore, since the scanning beam sweep S8 entered this data element 63, or bar, in the middle of the element, the data element only appears to be half as wide as it actually is.

Figure 5:
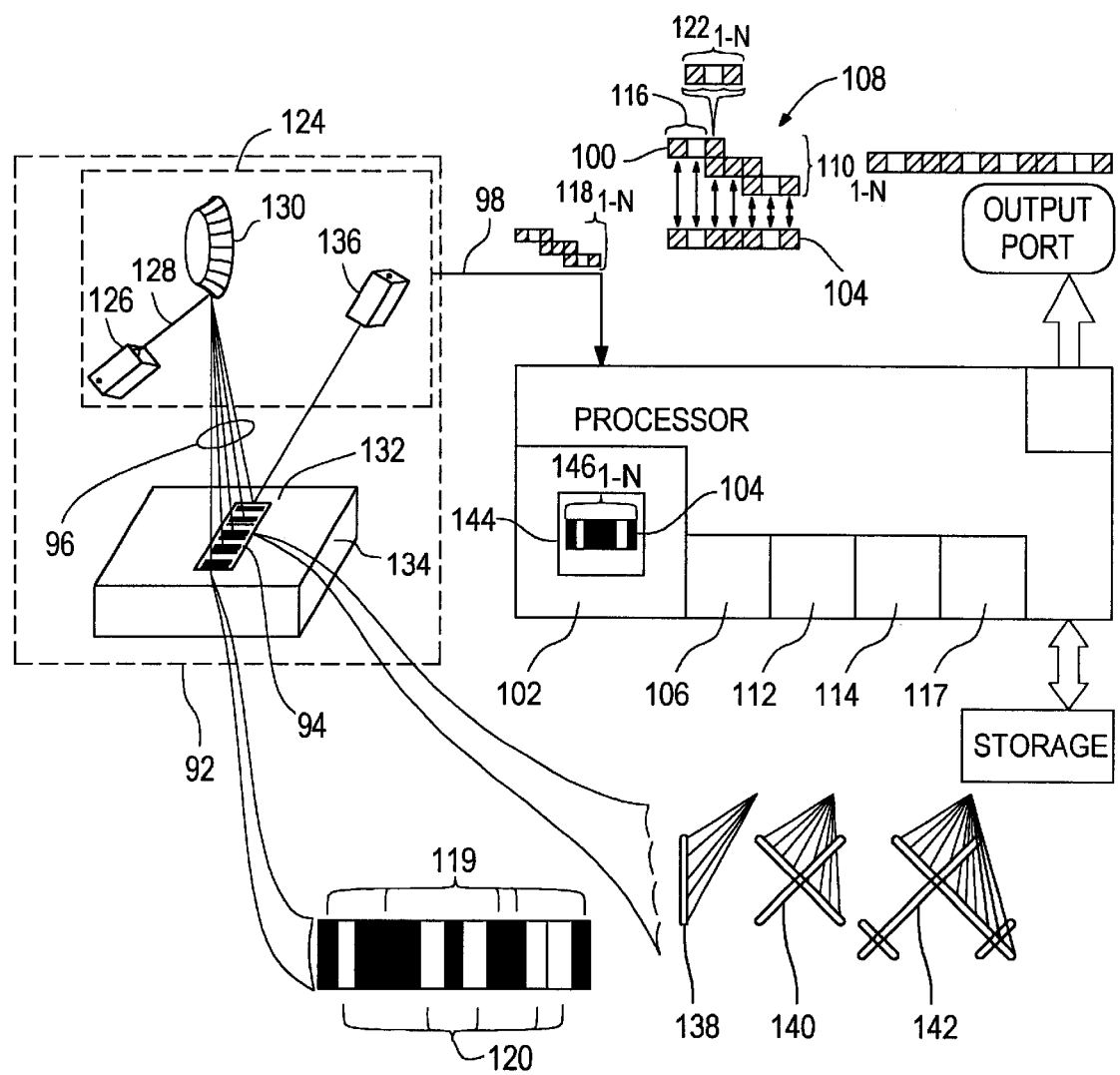
FIG. 5 is a more detailed view of one embodiment of this invention using a microprocessor.

As a result of these potential inaccuracies which occur at the beginning and/or end of scanning beam sweeps, the bar code scanning system 90, FIG. 5, when aligning compatible data elements, applies less weight to the value assigned to the data elements at the beginning and/or end of the scan since it is known that these elements could be truncated during scanning. In this case, accuracy is increased by aligning bar elements centrally located within each scan. Additionally, while it is disclosed that bars of bar codes consist of a solid color, traditionally black, and spaces of bar codes are traditionally uncolored, this is for illustrative purposes only. Bar codes can be constructed with a variety of different detectable surfaces: black/white; color/color; color/black; color/white; retroreflective/non-retroreflective; etc. Additionally, while it is disclosed that bar codes consist of linear elements, this is only for illustrative purposes, as the individual indicia of the bar code may be in any form currently used or any form developed sometime in the future, such as concentric rings.

In accordance with this invention, the bar code scanning system 90, FIG. 5, for scanning a bar code containing a reference key 104, includes: a scanning device 92 for successively scanning a bar code 94, and providing, for each scan 96, a plurality of data elements on line 98 forming a scan fragment 100 for at least a portion of the bar code 94. A key detector 102, responsive to the scanning device 92, includes a reference key 104 and identifies fragments $110_{1-n}$ containing at least a portion of the reference key 104. A fragment matching device 106, responsive to key detector 102, aligns an identified key fragment 100 with reference key 104. A key comparator 112, responsive to the fragment matching device 106 determines when a complete key 108 has been constructed from the identified key fragments $110_{1-n}$. A displacement calculator 114, responsive to the construction of the complete key 108, calculates a displacement 116 between the fragments $110_{1-n}$ which constructed the complete key 108. A data fragment aligner 117 aligns other data fragments $118_{1-n}$ of bar code 94 by placing each successive fragment in alignment with the previous fragment offset by the amount of the displacement 116.

Bar code 94 includes a plurality of bars 119 and a plurality of spaces 120 and each data element $122_{1-n}$ in fragment 100 is representative of one of the bars 119 and spaces 120 of bar code 94. Scanning device 92 includes a laser scanner 124.

Laser scanner 124 includes a laser source 126 for generating a scanning beam 128, a multi-faceted mirror wheel 130 for sweeping scanning beam 128 in a predetermined pattern 132 across the object 134 being scanned, and a radiation detector 136, responsive to the scanning beam 128 reflected from the object 134 being scanned, for generating the plurality of data elements $122_{1-n}$ on line 98. This predetermined pattern 132 may be one of many industry accepted patterns, such as a linear sweep 138, a simple "X" pattern 140, or a multiple "X" pattern 142.

Key detector 102 includes means for storing 144 reference key 104 where the reference key includes a sequence of data elements $146_{1-n}$. The reference key 104 is a string of data elements present at the beginning and/or end of any bar code scanned by the user, commonly referred to in the industry as a start indicator, a stop indicator, or both. According to this invention, a precursor to decoding a bar code is determining if you have a bar code to decode. This is accomplished by determining if the bar code contains a reference key 104.

Figure 6:
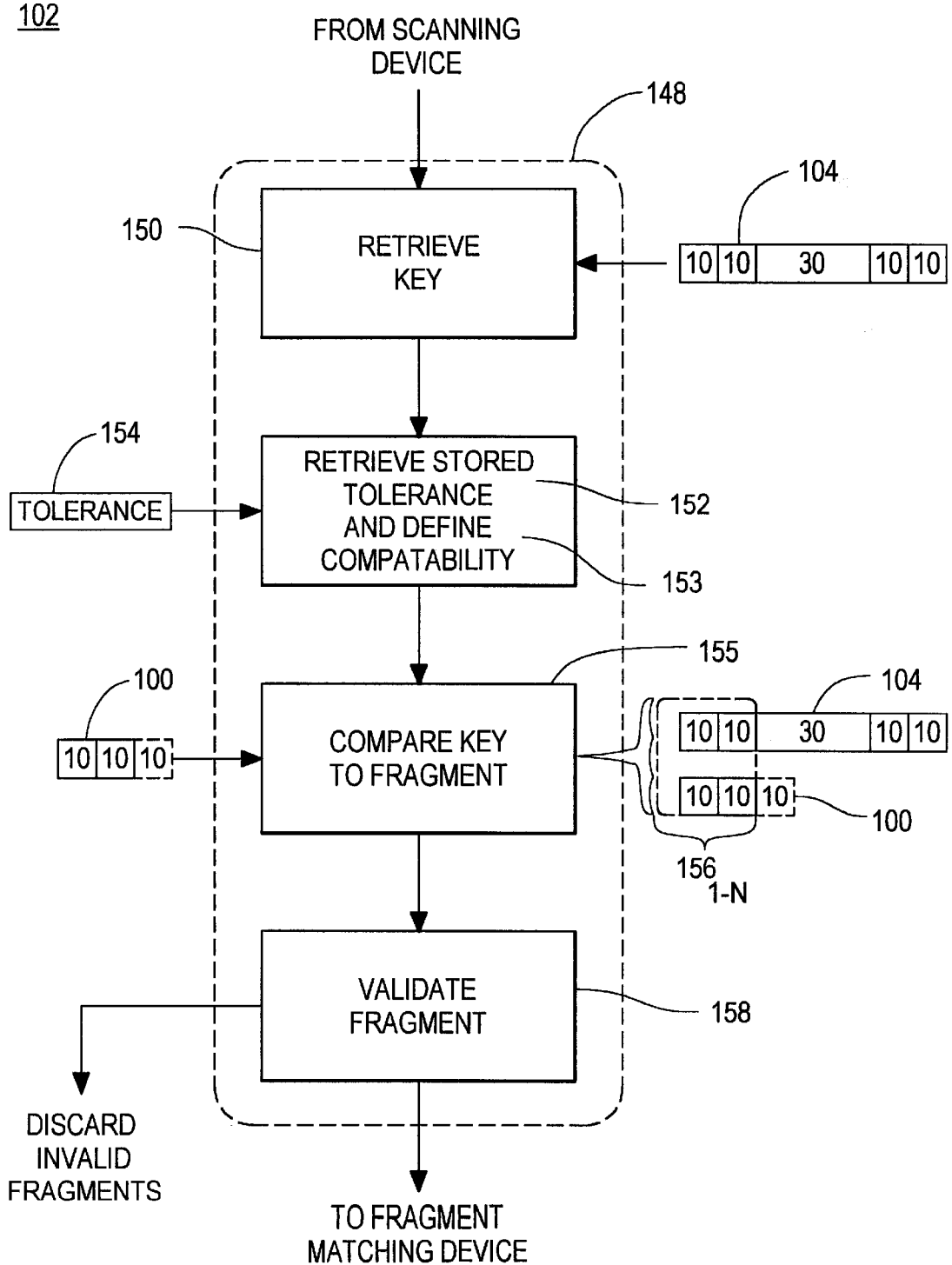
FIG. 6 is a block diagram of the key detector of this invention.

Key detector 102, FIG. 6, includes a comparing means 148 which performs the steps of retrieving 150 the reference key 104, retrieving 152 stored tolerance 154, and comparing 155 a portion of the reference key 104 to a portion of fragment 100 to identify which corresponding data elements $156_{1-n}$ are compatible. Comparing means 148 includes a means for defining 153 compatible data elements to be data elements equivalent to within a specified tolerance, for example ±15%. Comparing means 148 includes means for discarding 158 fragment 100 when corresponding data elements $156_{1-n}$ of fragment 100 and reference key 104 are not compatible. Since, as stated above, key 104 is present at the beginning and/or end of any bar code of interest to the user, any data fragment 100 which does not contain data elements which are compatible to that of the reference key (and, therefore, is not a key fragment) is discarded as extraneous information. In the event that fragment 100 is found to be invalid (e.g. not containing any data elements which are compatible to that of the reference key), the data fragment 100 is discarded as unusable or undesirable data. This comparing means 148 is a software routine executed by a computer.

Figure 7:
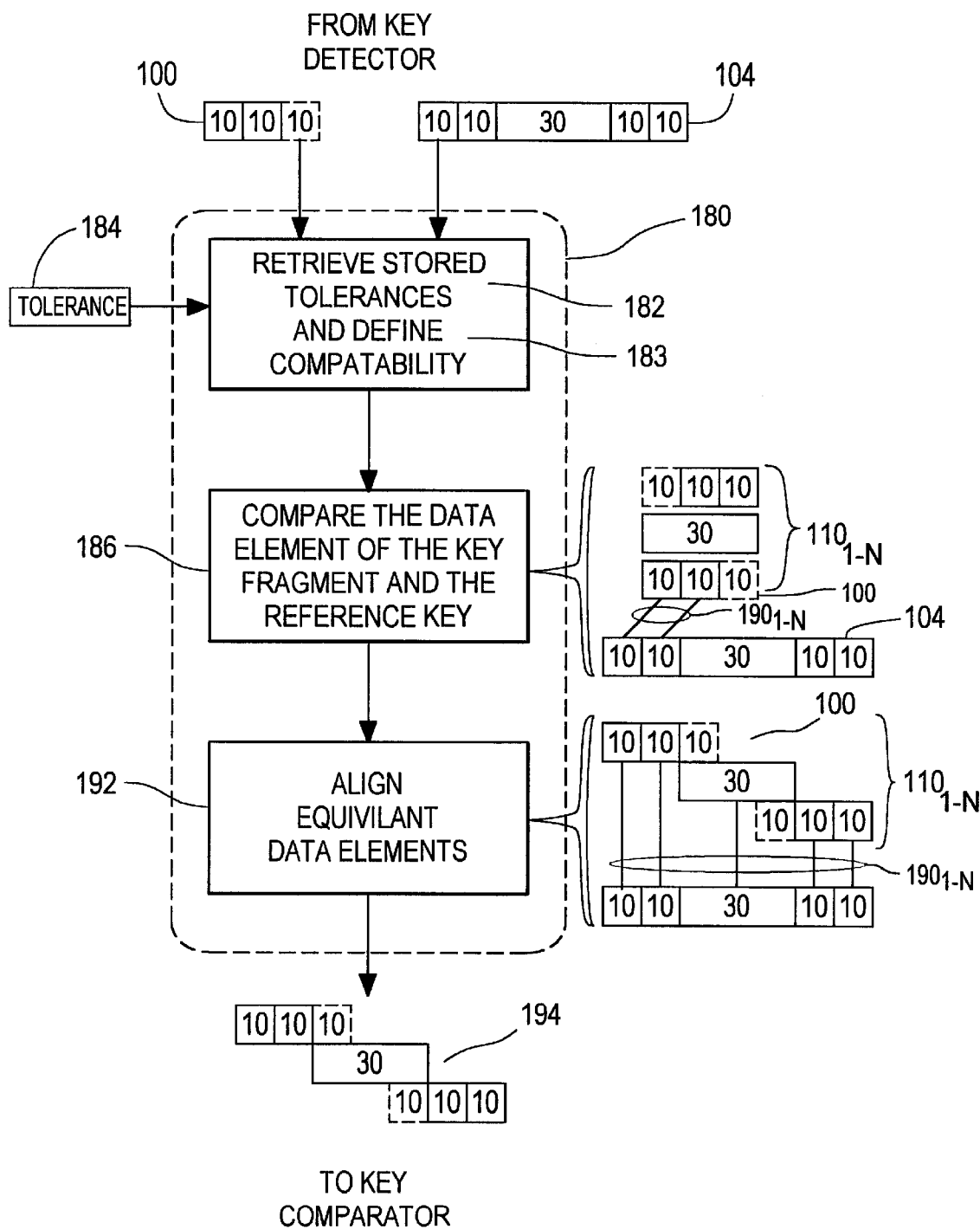
FIG. 7 is a block diagram of a fragment matching device according to this invention.

Fragment matching device 106, FIG. 7, includes an aligning means 180 which performs the steps of retrieving 182 stored tolerances 184, comparing 186 the data elements of key fragment 100 and reference key 104 to determine which data elements $190_{1-n}$ are compatible and aligning 192 key fragment 100 with reference key 104 by aligning compatible data elements $190_{1-n}$. Aligning means 180 includes a means for defining 183 compatible data elements to the data elements equivalent to within a specified tolerance, for example ±15%. The operation of aligning means 180 is repeated for all key fragments $110_{1-n}$, which are required to construct reference key 104 until complete key 194 is generated. Aligning means 180 is a software routine executed by a computer.

Figure 8:
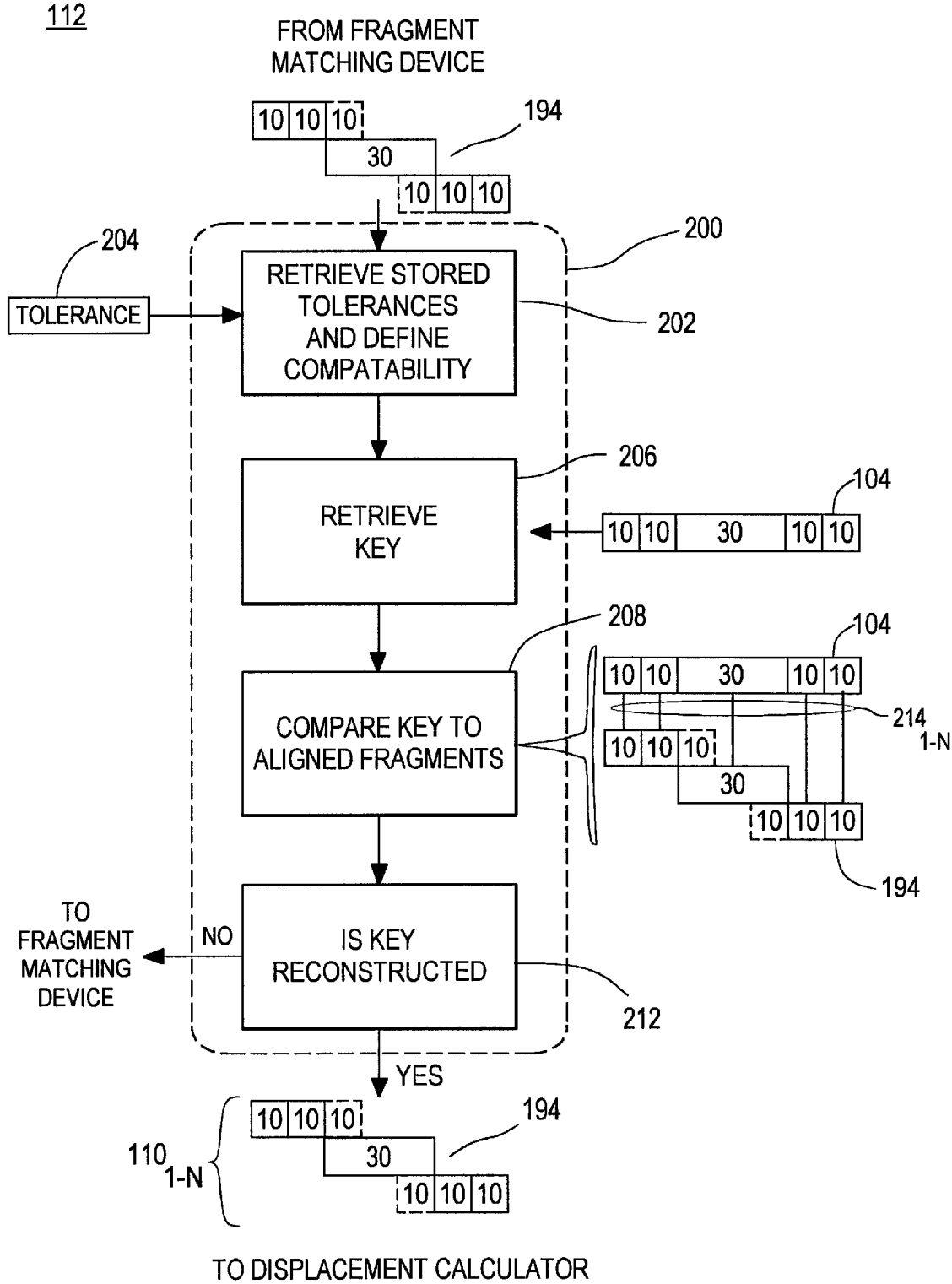
FIG. 8 is a block diagram of a key comparator according to this invention.

Key comparator 112, FIG. 8, includes a matching means 200 which performs the steps of retrieving 202 stored tolerances 204, retrieving 206 the reference key 104, and comparing 208 the reference key 104 to complete key 194 to determine 212 if reference key 104 has been completely reconstructed by complete key 194. This comparison 208 is performed by looking at the data elements of key 104 to determine if there are corresponding compatible data elements $214_{1-n}$ in complete key 194. While, in this particular example, all data elements of reference key 104 are present in complete key 194, this is not always true. In the event that key 104 has not been fully reconstructed, control is returned to the fragment matching device for retrieval and alignment of additional key fragments. Each time the fragment matching device retrieves and aligns an additional fragment, the complete key 194 is updated, where additional data elements from the additional fragments are appended to the complete key to form an updated complete key 194. Note that matching means 200 is continuously repeated until the entire reference key 104 has been constructed from complete key 194. Only when key 104 has been entirely reconstructed from complete key 194 will it be passed to the displacement calculator. Therefore, complete key 194 represents a composite fragment which fully reconstructs key 104 through the use of individual fragments $110_{1-n}$. Matching means 200 is a software routine executed by a computer.

Figure 9:
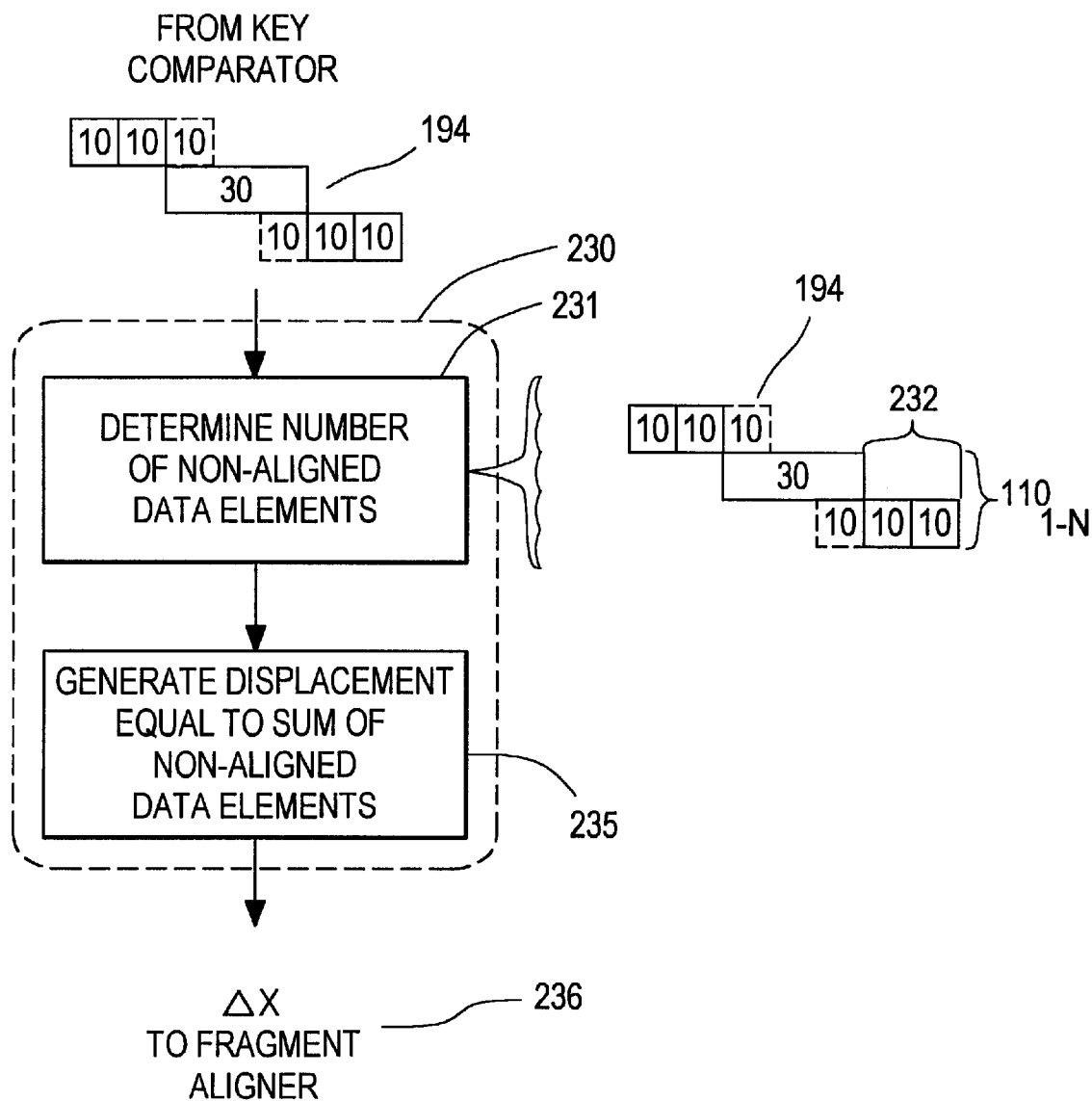
FIG. 9 is a block diagram of a displacement calculator according to this invention.

Displacement calculator 114, FIG. 9, includes a determining means 230 to determine 231 the sum value of the displacement 232 of key fragments $110_{1-n}$ which constructed complete key 194. Determining means 230 uses the sum value of non-aligned data elements 232 to generate 235 a displacement 236, represented here by Δx, which is subsequently used to offset and align the remaining data fragments of the bar code. Since the value of the data elements are indicative of the widths of the bars and spaces of the bar code, the numeric value of the unaligned data element 232 is equal to the amount that a subsequent data fragment must be offset, in relation to its previous data fragment, so that compatible data elements within the fragments are properly aligned. Determining means 230 is a software routine executed by a computer.

Figure 10:
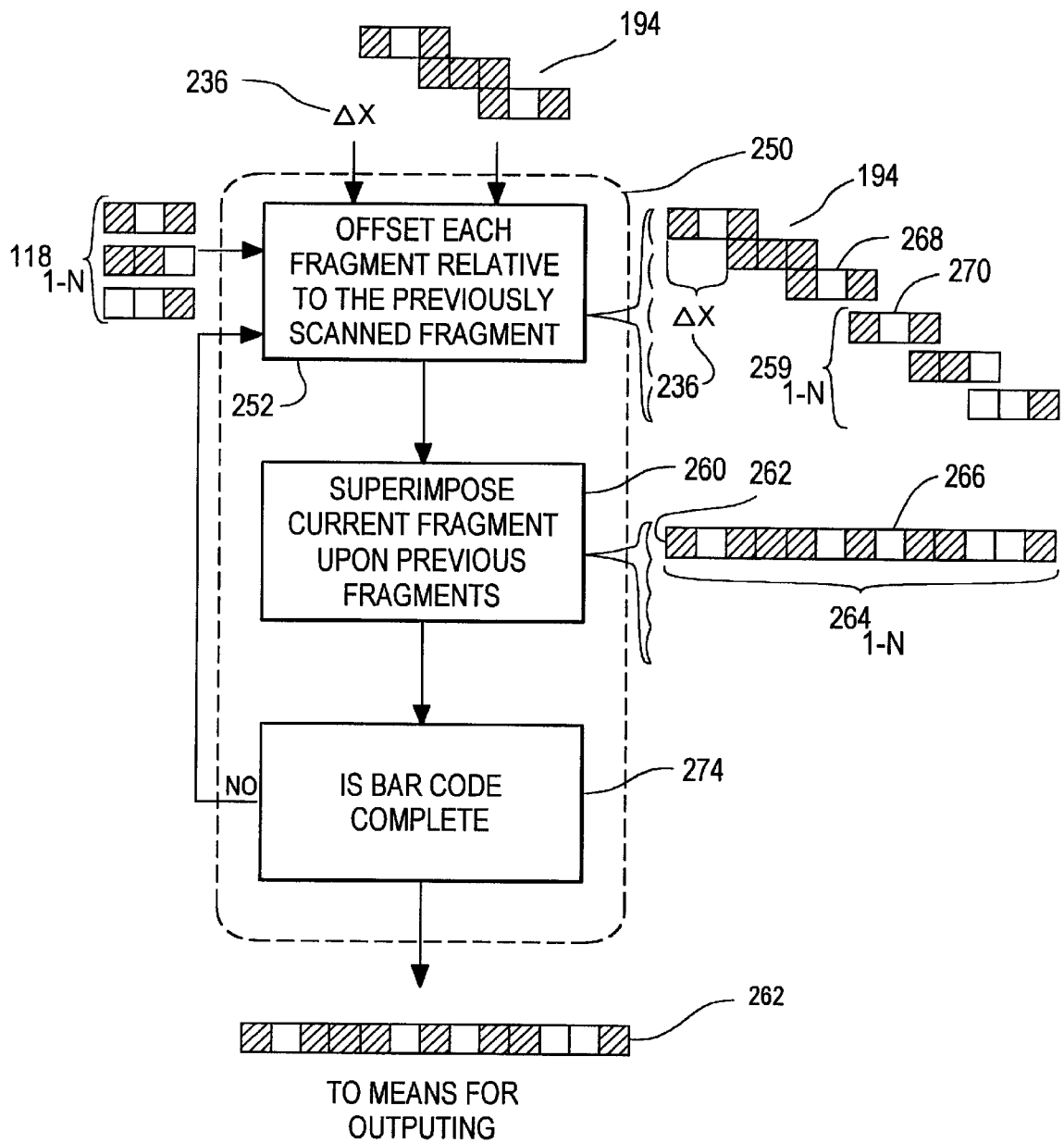
FIG. 10 is a block diagram of a data fragment aligner according to this invention.

Data fragment aligner 117, FIG. 10, includes an offsetting means 250 for offsetting 252 each subsequent data fragment, relative to its previously-scanned data fragment, a value equal to the displacement 236. Since, prior to fragment aligner 117, the only fragments aligned were those of complete key 194, this key 194 is already aligned and, therefore, the only fragments $118_{1-n}$ which must be aligned are those which comprise the data encoded within the bar code (the data fragments). Each one of these data fragments $118_{1-n}$ is shifted, relative to its previously-scanned fragment, an amount equal to displacement, ΔX, 236. As each of these data fragments $118_{1-n}$ is offset relative to its previously-scanned data fragment, offsetting means 250 superimposes 260 aligned data fragments $259_{1-n}$ to form a stitched bar code 262.

Concerning the value, or width, of data elements $264_{1-n}$ making up stitched bar code 262, their value is determined by taking the numeric average of the data elements superimposed to make that specific data element. For example, data element 266 in stitched bar code 262 has a value, or width, which is the numeric average of the widths of data elements 268 and 270.

This offsetting 252 and superimposition 260 process is continued until a complete bar code is assembled. The completion of the bar code is determined by looking at the data fragments presented to offsetting means 250. If a user-defined number of fragments contains no valid bar code data, it is concluded that the particular bar code being scanned has been completely scanned and all required data elements are available for decoding. In the event that completion checkpoint 274 determines that the bar code is incomplete, this offsetting 252 and superimposition 260 process is repeated until successful assembly of the entire bar code. Offsetting means 250 is a software routine executed by a computer.

Figure 11:
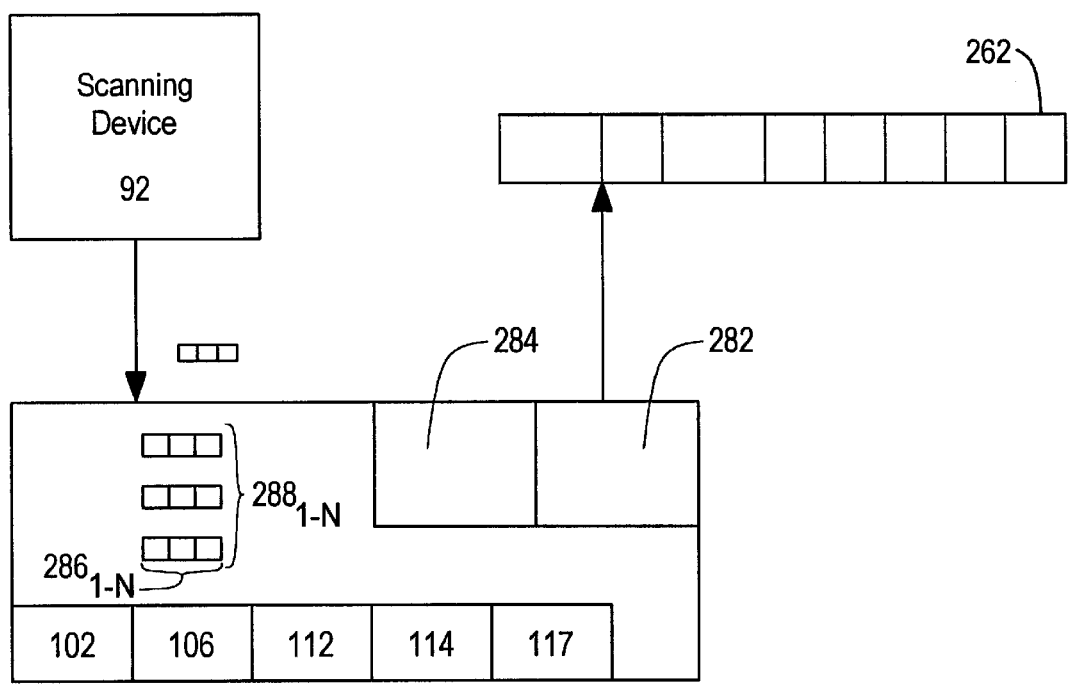
FIG. 11 is a diagrammatic view of a bar code scanning system according to this invention including a counter.

Bar code scanning system 280, FIG. 11, includes a means for outputting 282 stitched bar code 262 so that such bar code 262 can be decoded by standard bar code decoding techniques from AIM USA, such as Code 128 and Code 39. Bar code scanning system 280 includes a counter 284 for determining the width of the data elements $286_{1-n}$ making up fragments $288_{1-n}$.

Figure 12:
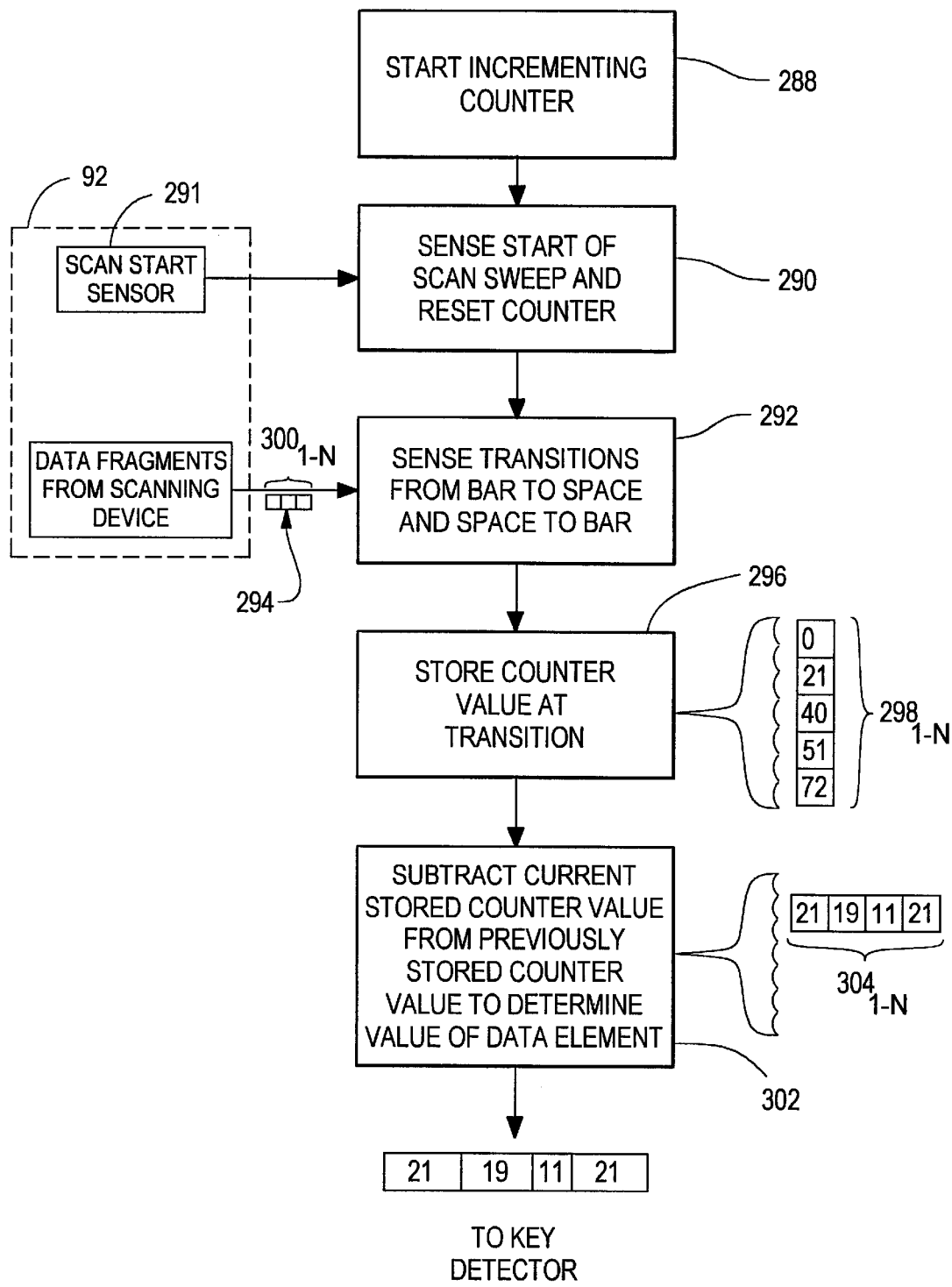
FIG. 12 is a block diagram of a counter according to this invention.

Counter 284, FIG. 12, includes a means 290 for resetting the counter periodically during each scanning beam sweep. Counter 284 is reset at the beginning of each scan sweep, as determined by scan start sensor 291 of scanning device 92. Counter 284 includes a means 288 for incrementing the counter as the scanning beam sweeps across the object being scanned. Counter 284 includes means 292 for sensing data element transitions and means 296 for storing the value $298_{1-n}$ of counter 284 at each transition between data elements $300_{1-n}$ of fragment 294. Counter 284 includes means 302 for subtracting the stored value of counter 284 at the previous transition from the stored value of counter 284 at the current transition to generate a data element width $304_{1-n}$ for each data element $300_{1-n}$. For example, the counter values in FIG. 12 stored for each transition are (0), (21), (40), (51), and (72). Therefore, the four data elements $304_{1-n}$ associated with these five counter values $298_{1-n}$ are (21), (11), (19), and (21). Counter 284 is a software routine executed by a computer.

Figure 13:
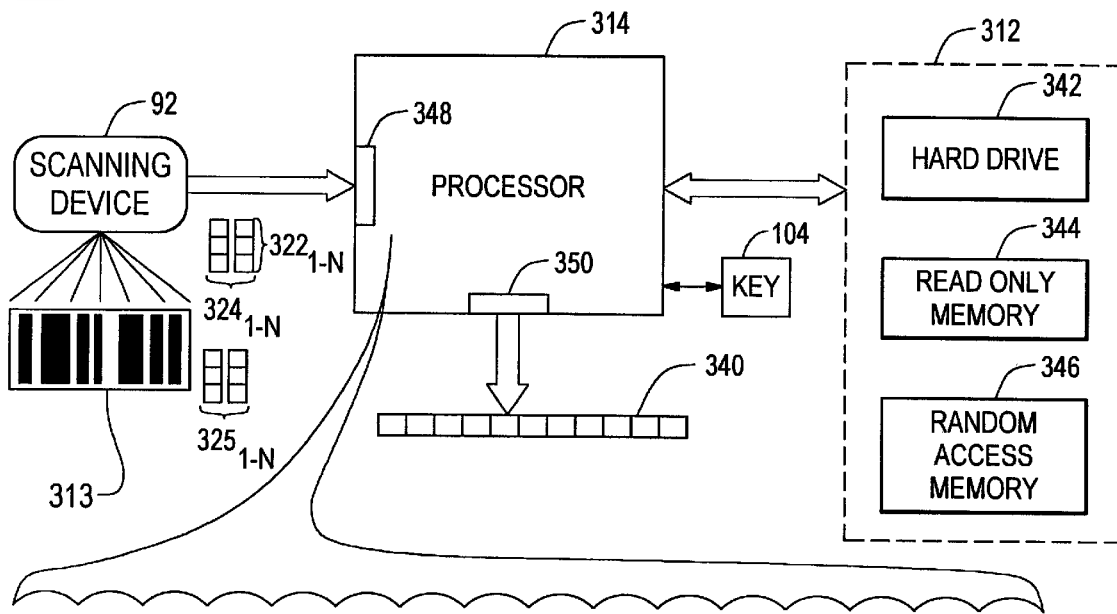
FIG. 13 is a diagrammatic view of another embodiment of the bar code scanning system of this invention including a processor and computer-readable medium.
Figure 13:
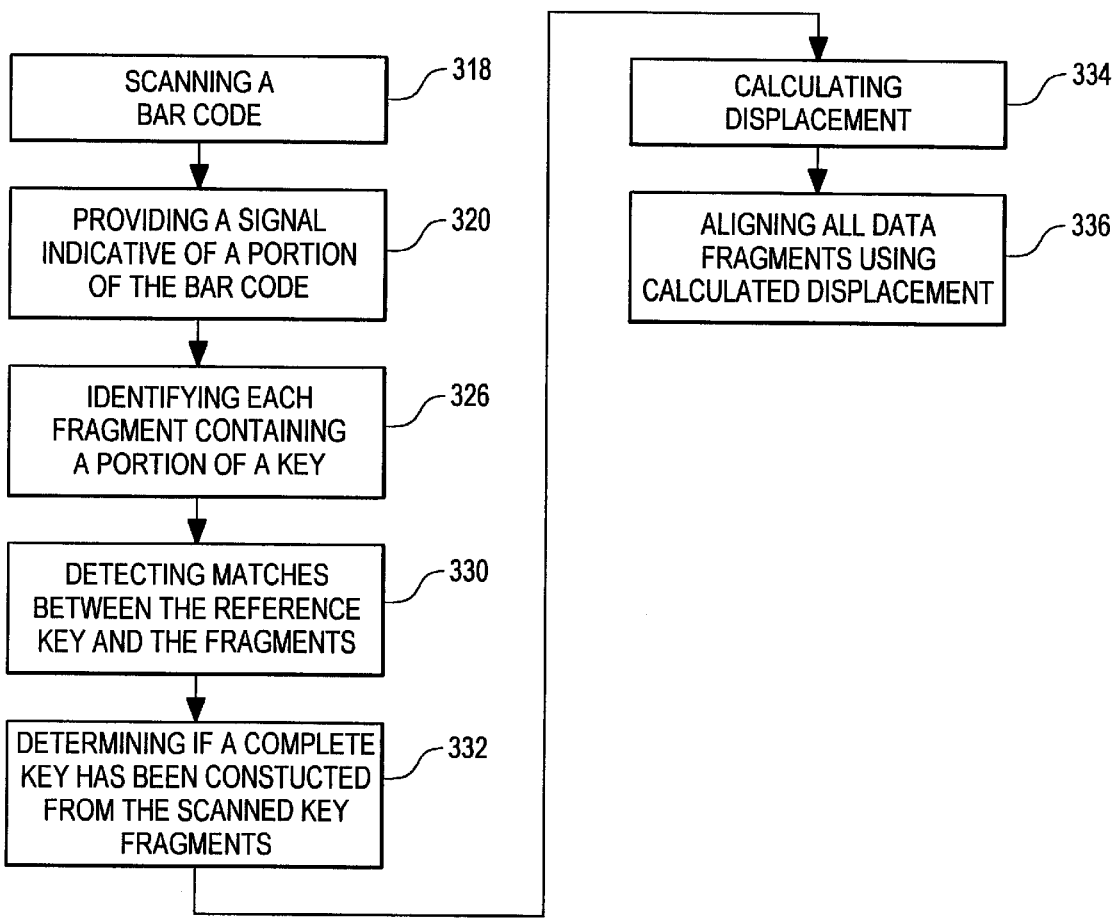

Another embodiment of the bar code scanning system 310, FIG. 13, of this invention includes a computer readable medium 312 having a plurality of instructions stored thereon which, when executed by a processor 314, cause the processor to perform the steps of: repeatedly scanning 318 a bar code 313; providing 320 a plurality of data elements $322_{1-n}$ forming a scan fragment $324_{1-n}$ for at least a portion of bar code 313 as scanned by scanning device 92; identifying 326 each fragment $324_{1-n}$ containing a portion of key 104 which is accessible by processor 314; detecting 330 matches between reference key 104 and fragments $324_{1-n}$; determining 332 if a complete key 104 has been constructed from the scanned key fragments; calculating 334 a displacement between the key fragments $324_{1-n}$ which constructed the complete key; and aligning 336 all data fragments $325_{1-n}$ of bar code 313 by offsetting the data fragments $325_{1-n}$ an amount equal to the calculated displacement to generate a stitched bar code 340.

Typical examples of computer readable medium 312 are hard drive 342, read-only memory 344 and random access memory 346. Processor 314 includes an input port 348 for retrieving data from scanning device 92 and an output port 350 for outputting stitched bar code 340.

Figure 14:
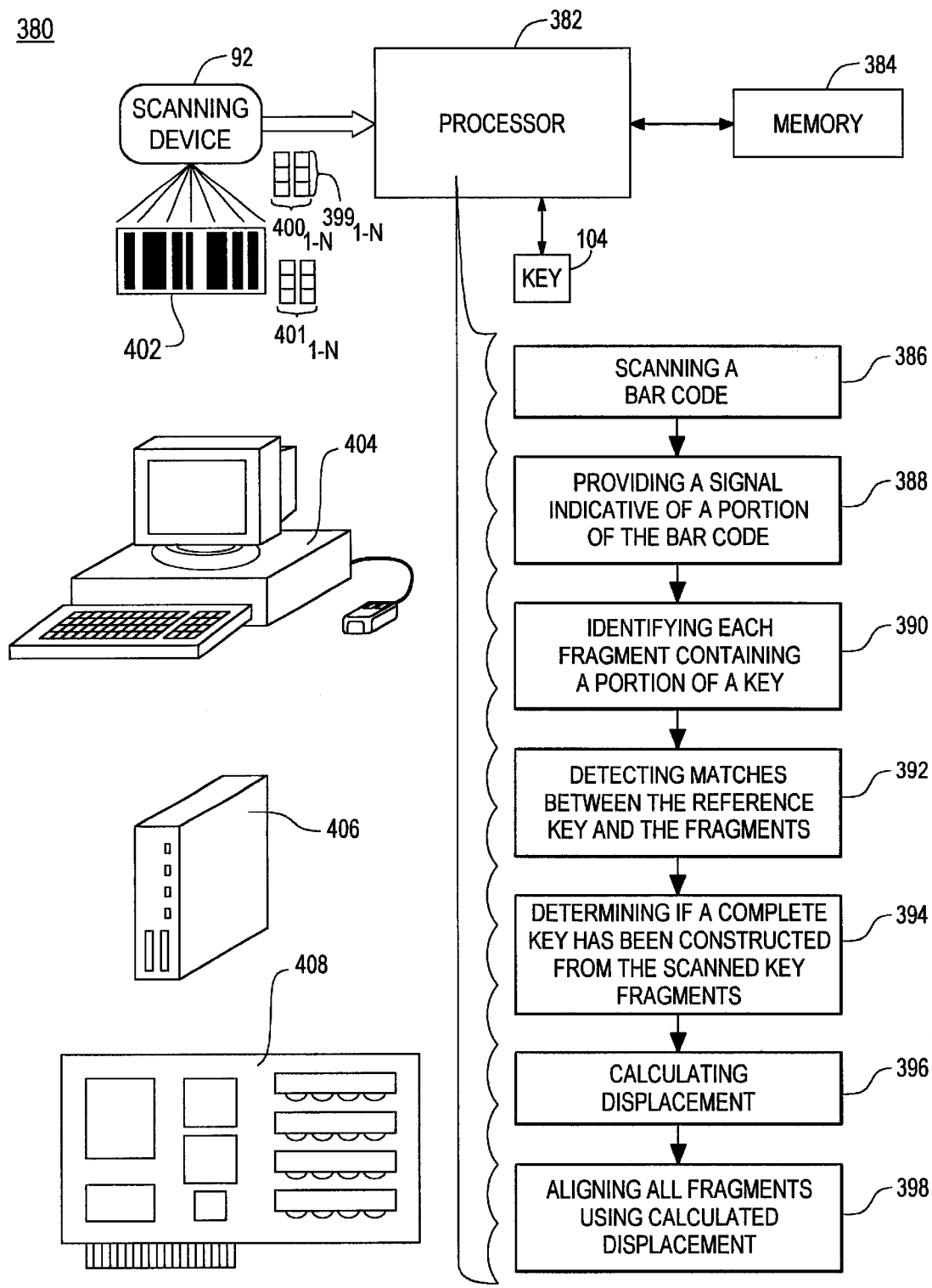
FIG. 14 is a diagrammatic view of yet another embodiment of the bar code scanning system of this invention including a processor and memory.

Another embodiment of the bar code scanning system 380, FIG. 14, of this invention includes a processor 382 and a memory 384 configured to perform the steps of: repeatedly scanning 386 a bar code 402; providing 388 for each scan a plurality of data elements $399_{1-n}$ forming a scan fragment $400_{1-n}$ for at least a portion of the bar code 402; identifying 390 each fragment $400_{1-n}$ containing a portion of key 104 which is accessible by processor 382; detecting 392 matches between reference key 104 and fragments $400_{1-n}$; determining 394 if a complete key 104 has been constructed from the scanned key fragments $400_{1-n}$; calculating 396 a displacement between the key fragments $400_{1-n}$ which constructed the complete key; and aligning 398 all data fragments $401_{1-n}$ of bar code 402 by offsetting data fragments $401_{1-n}$ an amount equal to the calculated displacement to generate a stitched bar code.

The processor 382 and memory 384 may be incorporated into a personal computer 404, a programmable logic controller 406, and a single board computer 408.

Figure 15:
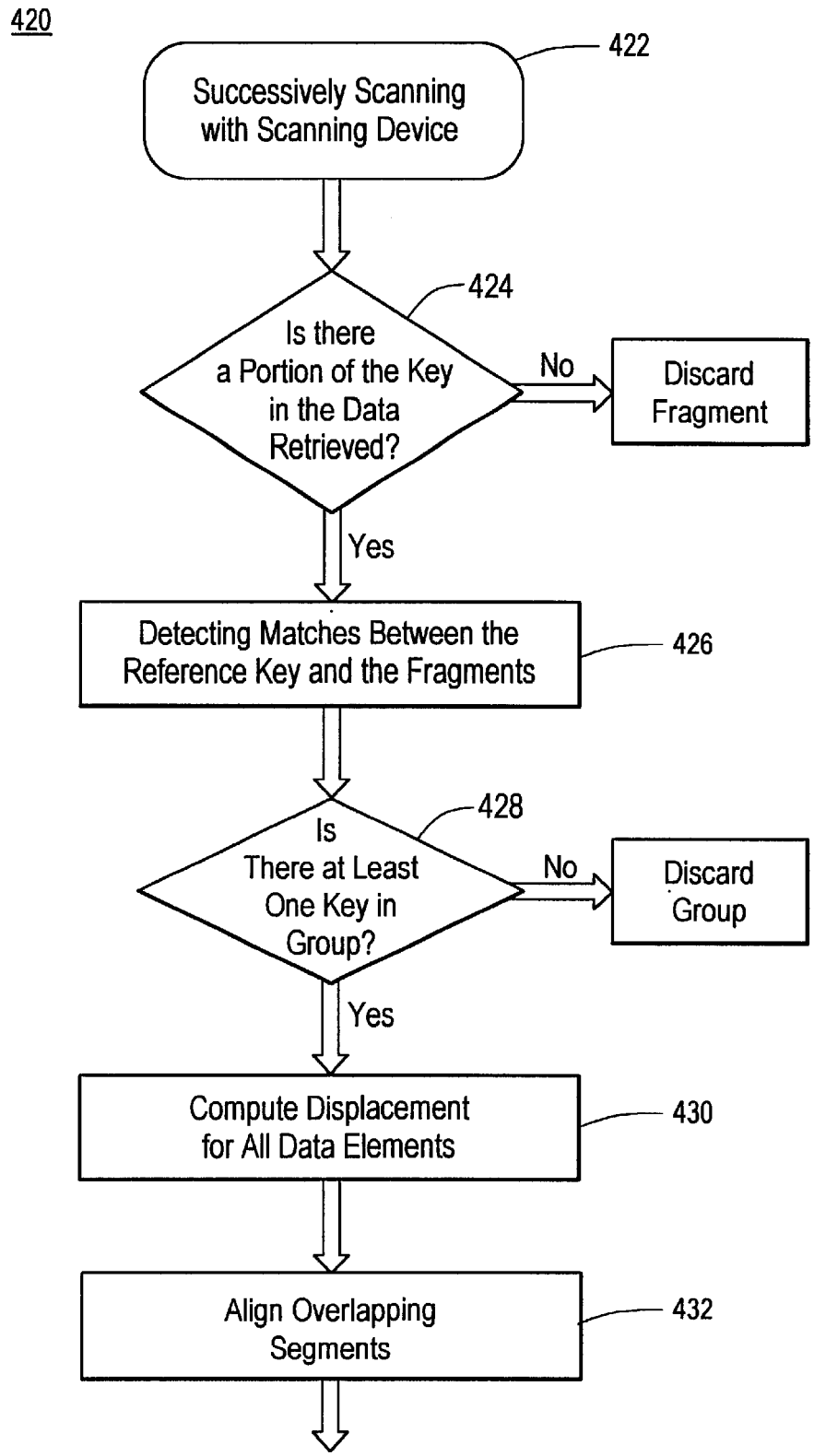
FIG. 15 is a flow chart of the bar code scanning method of this invention.

Another embodiment of the bar code scanning method 420, FIG. 15, of this invention includes a method for assembling a bar code containing a reference key from a series of bar code fragments comprising the steps of: scanning 422 a bar code successively to provide a plurality of data elements forming a scan fragment for at least a portion of the bar code, identifying 424 each fragment containing at least a portion of the key embedded in the bar code, detecting 426 matches between the reference key and the scan fragments, determining 428 if a complete key has been constructed from the scanned key fragments, calculating 430 a displacement between each key fragment which constructed the complete key, and aligning 432 all data fragments of the bar code by placing successive data fragments in alignment with previous data fragments offset by the amount of the calculated displacement.

It should be appreciated that these are only a few embodiments of the specific invention and that this system and method could be constructed using any combination of hardware/firmware components and software-based subroutines.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A bar code scanning system for scanning a bar code containing a key comprising:

a scanning device for successively scanning the bar code and providing, for each scan, a plurality of data elements forming a scan fragment for at least a portion of the bar code;

a key detector, including a reference key, responsive to said scanning device, for identifying a fragment containing at least a portion of a key;

a fragment matching device, responsive to said key detector, for aligning an identified key fragment with said reference key;

a key comparator, responsive to said fragment matching device, for determining when a complete key has been constructed from said key fragments;

a displacement calculator, responsive to the construction of said complete key, for calculating a displacement between the key fragments which constructed said complete key; and a data fragment aligner for aligning data fragments of the bar code by placing each successive data fragment in alignment with the previous data fragment offset by the amount of said displacement.

2. The bar code scanning system of claim 1 in which the bar code includes a plurality of bars and spaces and each said data element in said fragments is representative of one of said bar and said space.

3. The bar code scanning system of claim 2 in which said scanning device includes a laser scanner.

4. The bar code scanning system of claim 3 in which said laser scanner includes a laser source for generating a scanning beam, a multi-faceted mirror wheel for sweeping said scanning beam in a predetermined pattern across the object being scanned, and a radiation detector, responsive to said scanning beam reflected from the object being scanned, for generating said plurality of data elements.

5. The bar code scanning system of claim 4 in which said predetermined pattern is an "X".

6. The bar code scanning system of claim 4 including a counter for determining the width of each said data element in each said fragment.

7. The bar code scanning system of claim 6 in which said counter includes a means for resetting said counter periodically during each said scanning beam sweep.

8. The bar code scanning system of claim 7 in which said means for resetting resets said counter at the beginning of each said scanning beam sweep.

9. The bar code scanning system of claim 7 in which said counter includes means for incrementing said counter as said scanning beam sweeps across the object being scanned.

10. The bar code scanning system of claim 9 in which said counter includes means for storing the value of said counter at each transition between data elements.

11. The bar code scanning system of claim 10 in which said counter includes means for subtracting the stored counter value of the previous transition from the stored counter value of the current transition to generate a data element width for each said data element.

12. The bar code scanning system of claim 11 in which said counter is a software routine.

13. The bar code scanning system of claim 1 in which said key detector includes means for storing said reference key where said reference key includes a plurality of data elements.

14. The bar code scanning system of claim 13 in which said key detector includes means for comparing a portion of said data elements of a said fragment to said reference key to determine if corresponding data elements in said fragment and said reference key are compatible.

15. The bar code scanning system of claim 14 in which said means for comparing includes means for defining compatible data elements to be data elements equivalent to within a specified tolerance.

16. The bar code scanning system of claim 15 in which said specified tolerance is ±15%.

17. The bar code scanning system of claim 14 in which said means for comparing includes means for discarding said fragments when said portion of said data elements of said fragment are not compatible with said data elements of said reference key.

18. The bar code scanning system of claim 17 in which said means for comparing is a software routine.

19. The bar code scanning system of claim 1 in which said fragment matching device includes means for aligning the data elements of a first key fragment with the data elements of said reference key and determining which data elements are compatible.

20. The bar code scanning system of claim 19 in which the data elements of each subsequent key fragment after said first key fragment is aligned with the data elements of the reference key and are aligned and combined with each previous key fragment to form a complete key, as determined by said key comparator.

21. The bar code scanning system of claim 20 in which said displacement calculator includes offset means for determining the sum value of non-aligned data elements in said constructed key.

22. The bar code scanning system of claim 21 in which said offset means is a software routine.

23. The bar code scanning system of claim 20 in which said data fragment aligner includes a means for offsetting each said data fragment a value equal to said displacement, relative to each said previous data fragment, to create a stitched bar code, where said means for offsetting continues offsetting subsequent data fragments a value equal to said displacement until all said subsequent data fragments are offset relative to the corresponding previously-scanned data fragment and superimposed upon the corresponding previously-scanned data fragment.

24. The bar code scanning system of claim 23 in which said means for offsetting is a software routine.

25. The bar code scanning system of claim 19 in which said means for aligning includes means for defining compatible data elements to be data elements equivalent to within a specified tolerance.

26. The bar code scanning system of claim 25 in which said specified tolerance is ±15%.

27. The bar code scanning system of claim 26 in which said means for aligning is a software routine.

28. The bar code scanning system of claim 1 in which said reference key includes a start indicator.

29. The bar code scanning system of claim 1 in which said reference key includes a stop indicator.

30. The bar code scanning system of claim 1 in which said reference key includes both a start indicator and a stop indicator.

31. A computer readable medium having a plurality of instructions stored thereon which, when executed by the processor, cause the processor to perform the steps of:
   scanning a bar code successively;
   providing, for each scan, a plurality of data elements forming a scan fragment for at least a portion of the bar code;
   identifying each said fragment containing a portion of a reference key;
   detecting when there has been a match between a reference key and said identified key fragments;
   determining if a complete key has been constructed from said key fragments;
   calculating a displacement between the key fragments which constructed said complete key; and
   aligning data fragments of the bar code by placing each successive data fragment in alignment with the previous data fragment offset by the amount of said displacement.

32. The computer readable medium of claim 31 in which said computer readable medium is a hard disk drive.

33. The computer readable medium of claim 31 in which said computer readable medium is a read-only memory.

34. The computer readable medium of claim 31 in which said computer readable medium is a random-access memory.

35. A processor and memory configured to perform the steps of:
   scanning a bar code successively;
   providing, for each scan, a plurality of data elements forming a scan fragment for at least a portion of the bar code;
   identifying each said fragment containing a portion of a reference key;
   detecting when there has been a match between a reference key and said identified key fragments;
   determining if a complete key has been constructed from said key fragments;
   calculating a displacement between the key fragments which constructed said complete key; and
   aligning data fragments of the bar code by placing each successive data fragment in alignment with the previous data fragment offset by the amount of said displacement.

36. The processor and memory of claim 35 in which said processor and memory are incorporated into a personal computer.

37. The processor and memory of claim 35 in which said processor and memory are incorporated into a programmable logic controller.

38. The processor and memory of claim 35 in which said processor and memory are incorporated into a single-board computer.

39. A method for assembling a bar code containing a reference key from a series of bar code fragments comprising the steps of:

scanning a bar code successively;

providing, for each scan, a plurality of data elements forming a scan fragment for at least a portion of the bar code;

identifying each said fragment containing a portion of a key;

detecting when there has been a match between said reference key and said identified key fragments;

determining if a complete key has been constructed from said key fragments;

calculating a displacement between the key fragments which constructed said complete key; and aligning data fragments of the bar code by placing each successive data fragment in alignment with the previous data fragment offset by the amount of said displacement.

* * * * *